(12) United States Patent
Wagener

(10) Patent No.: US 10,104,456 B2
(45) Date of Patent: *Oct. 16, 2018

(54) MULTIPOINT, CONTENTIONLESS WAVELENGTH SELECTIVE SWITCH (WSS)

(71) Applicant: Nistica, Inc., Bridgewater, NJ (US)

(72) Inventor: Jefferson L. Wagener, Morristown, NJ (US)

(73) Assignee: Nistica, Inc., Bridgewater, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/589,041

(22) Filed: May 8, 2017

(65) Prior Publication Data

US 2017/0311058 A1    Oct. 26, 2017

Related U.S. Application Data

(63) Continuation of application No. 14/709,770, filed on May 12, 2015, now Pat. No. 9,661,406.

(60) Provisional application No. 62/113,738, filed on Feb. 9, 2015.

(51) Int. Cl.
*H04J 14/02* (2006.01)
*H04Q 11/00* (2006.01)

(52) U.S. Cl.
CPC ...... *H04Q 11/0005* (2013.01); *H04J 14/0212* (2013.01); *H04Q 2011/0016* (2013.01); *H04Q 2011/0024* (2013.01); *H04Q 2011/0041* (2013.01); *H04Q 2011/0047* (2013.01); *H04Q 2011/0058* (2013.01)

(58) Field of Classification Search
CPC ............. H04Q 11/0005; H04J 14/0212; H04B 10/07955
See application file for complete search history.

(56) References Cited

U.S. PATENT DOCUMENTS

| 6,430,328 | B1 | 8/2002 | Culver |
| 6,956,687 | B2 | 10/2005 | Moon |
| 7,092,599 | B2 | 8/2006 | Frisken |
| 7,123,833 | B2 | 10/2006 | Szczepanek |

(Continued)

FOREIGN PATENT DOCUMENTS

WO    2008057347 A2    5/2008

*Primary Examiner* — Dzung Tran
(74) *Attorney, Agent, or Firm* — Mayer & Williams, PC; Stuart H. Mayer

(57) ABSTRACT

An optical device includes a plurality of optical input ports, a plurality of optical output ports, a wavelength dispersion arrangement and at least one optical beam steering arrangement. The plurality of optical input ports is configured to receive optical beams each having a plurality of wavelength components. The wavelength dispersion arrangement receives the optical beams and spatially separates each of the optical beams into a plurality of wavelengths components. The optical beam steering arrangement has a first region onto which the spatially separated wavelength components are directed and a second region onto which any subset of the plurality of wavelength components of each of the optical beams is selectively directed after the wavelength components in each of the subsets are spatially recombined with one another. The optical beam steering arrangement selectively directs each of subset of the plurality of wavelength components to a different one of the optical output ports.

91 Claims, 7 Drawing Sheets

WDM Ports          1 λ Port

(56) References Cited

U.S. PATENT DOCUMENTS

| | | |
|---|---|---|
| 7,126,740 B2 | 10/2006 | Szczepanek |
| 7,397,980 B2 | 7/2008 | Frisken |
| 7,468,840 B2 | 12/2008 | Cohen |
| 8,867,016 B2 | 10/2014 | Mao |
| 9,661,406 B2 * | 5/2017 | Wagener ............ H04Q 11/0005 |
| 2007/0268537 A1 | 11/2007 | Holmes |
| 2012/0002917 A1 | 1/2012 | Colbourne |
| 2014/0072302 A1 * | 3/2014 | Iwama ............... H04Q 11/0005 |
| | | 398/48 |
| 2015/0085884 A1 | 3/2015 | Fontaine |
| 2015/0180603 A1 * | 6/2015 | Darling .............. H04J 14/0212 |
| | | 398/49 |
| 2015/0208144 A1 | 7/2015 | Holmes |
| 2015/0277052 A1 | 10/2015 | Keyworth |
| 2016/0197695 A1 * | 7/2016 | Seno ................... H04B 10/548 |
| | | 398/83 |

\* cited by examiner

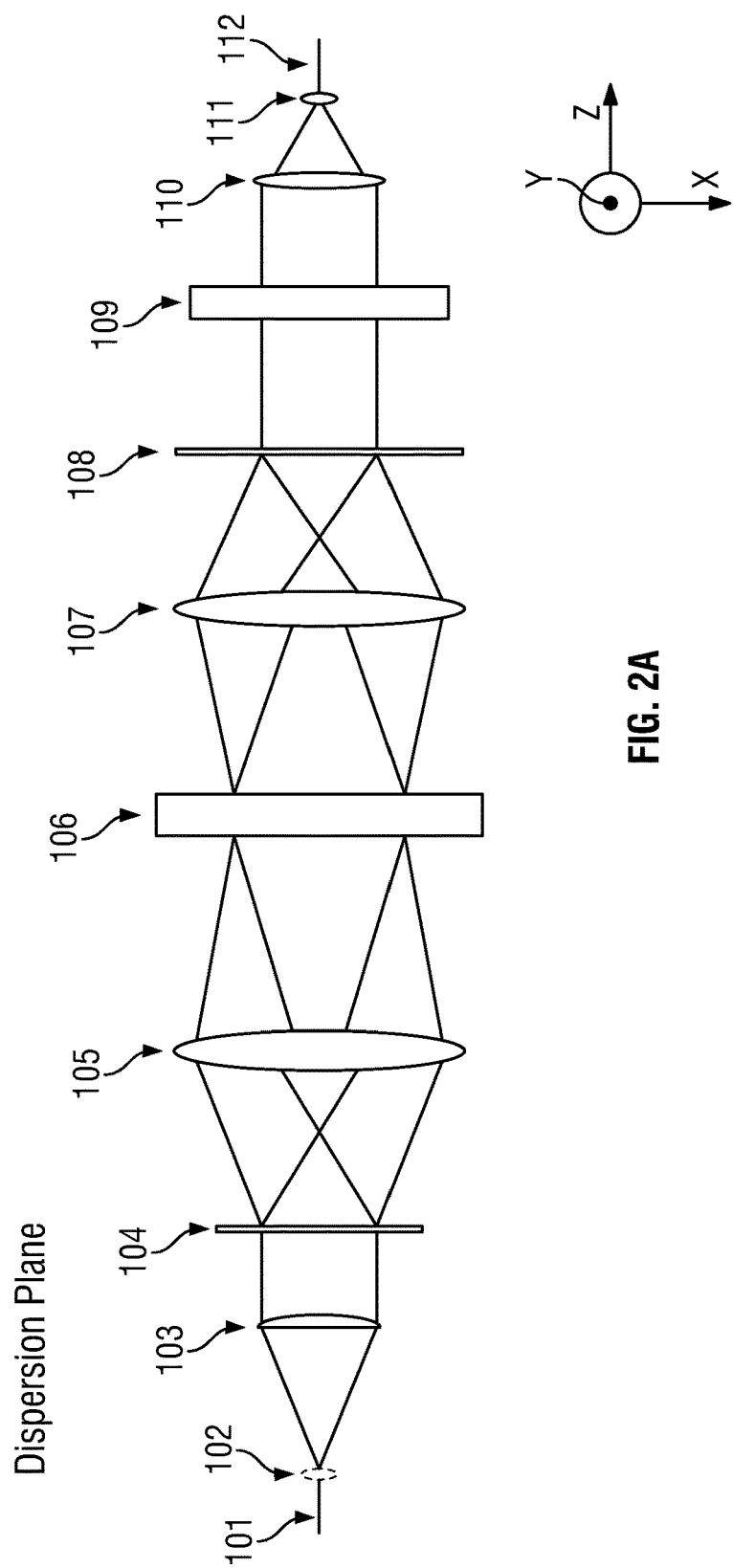

MULTIPOINT, CONTENTIONLESS WAVELENGTH SELECTIVE SWITCH (WSS)

CROSS REFERENCE TO RELATED APPLICATION

This application is a continuation of U.S. application Ser. No. 14/709,770, filed May 12, 2015 and claims the benefit of U.S. Provisional Application Ser. No. 62/113,738, filed Feb. 9, 2015 entitled "Multipoint, Contentionless Wavelength Selective Switch (WSS)", the contents of which are incorporated herein by reference.

BACKGROUND

In an optical communication network, optical signals having a plurality of optical channels at individual wavelengths (i.e., channels), are transmitted from one location to another, typically through a length of optical fiber. Various types of optical switches are available which allow switching of optical signals from one optical fiber to another. A wavelength-selective switch (WSS), allows reconfigurable wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching has many attractive features due to the ability to automatically create or re-route optical paths of individual wavelength channels. It accelerates service deployment, accelerates rerouting around points of failure of an optical network, and reduces capital and operating expenses for a service provider, as well as creating a future-proof topology of the network.

Different switching architectures offer different degrees of flexibility with respect to the allocation and routing of individual wavelengths. FIG. 1 shows a functional block diagram of an N×M optical switch 12 illustrating one routing function that is sometimes desired. The N×M optical switch 10 has N input ports $10_1$, $10_2$, $10_3$ ... $10_N$ ("10") and M output ports $15_1$, $15_2$, $15_3$, ... $15_M$ ("15"). The input ports 10 are WDM ports that are able to receive a wavelength division multiplexed (WDM) signal that includes multiple wavelengths or channels. As explained below, the routing function that is desired is sometimes referred to as contentionless routing.

In contentionless routing, if, as shown in FIG. 1, a signal 1 of wavelength $\lambda_1$ received on one input port is sent to a given output port and signal 2 of the same wavelength $\lambda_1$ (but with different data content) is received on a different input port, then signal 2 can be sent to any output port except to the output port to which signal is sent. In other words, optical switch 12 is able to establish a connection from one input port to one output at one wavelength without preventing a second connection from being established at that same wavelength between a second input port and a second output port.

Wavelength selective switches having the functionality shown in FIG. 1 have been demonstrated. Such wavelength selective switches have a relatively small number of input and output ports and are not easily scaled up to provide significantly more ports. For example, U.S. Patent Publication No. 2014/0294346 to Neilson et al. shows one WSS that employs an LCOS array as the switching element. In this device each WDM signal received on an input port is imaged and spectrally dispersed along a separate row of the LCOS array. Because of its design, this WSS requires M physically separate rows to be allocated on the LCOS array to provide the functionality of an N×M switch, where M>N. This becomes impractical for devices with a relatively large number of ports because of the large amount of space that needs to be allocated on the surface of the LCOS array.

SUMMARY

In accordance with one aspect of the invention, an optical device is provided which includes a plurality of optical input ports, a plurality of optical output ports, a wavelength dispersion arrangement and at least one optical beam steering arrangement. The plurality of optical input ports is configured to receive optical beams each having a plurality of wavelength components. The wavelength dispersion arrangement receives the optical beams and spatially separates each of the optical beams into a plurality of wavelengths components. The optical beam steering arrangement has a first region onto which the spatially separated wavelength components are directed and a second region onto which any subset of the plurality of wavelength components of each of the optical beams is selectively directed after the wavelength components in each of the subsets are spatially recombined with one another. The optical beam steering arrangement selectively directs each of the subsets of the plurality of wavelength components to a different one of the optical output ports.

In accordance with another aspect of the invention, an optical device is provided that includes a plurality of optical input ports, a plurality of optical output ports, a wavelength dispersion element and a switching arrangement. The plurality of optical input ports is configured to receive optical beams each having a plurality of wavelength components. The wavelength dispersion element receives the optical beams and spatially separates each of the optical beams into a plurality of wavelengths components. The switching arrangement receives the wavelength components of the optical beams and selectively directs any subset of the plurality of wavelength components of each of the optical beams to a different one of the optical output ports, provided that wavelength components of optical beams received by two of the input ports cannot be simultaneously directed to a common one of the output ports.

BRIEF DESCRIPTION OF THE DRAWINGS

FIGS. 2A and 2B are top and side views respectively, of one example of a simplified optical device such as a multipoint contentionless wavelength selective switch.

DETAILED DESCRIPTION

Figure 1:
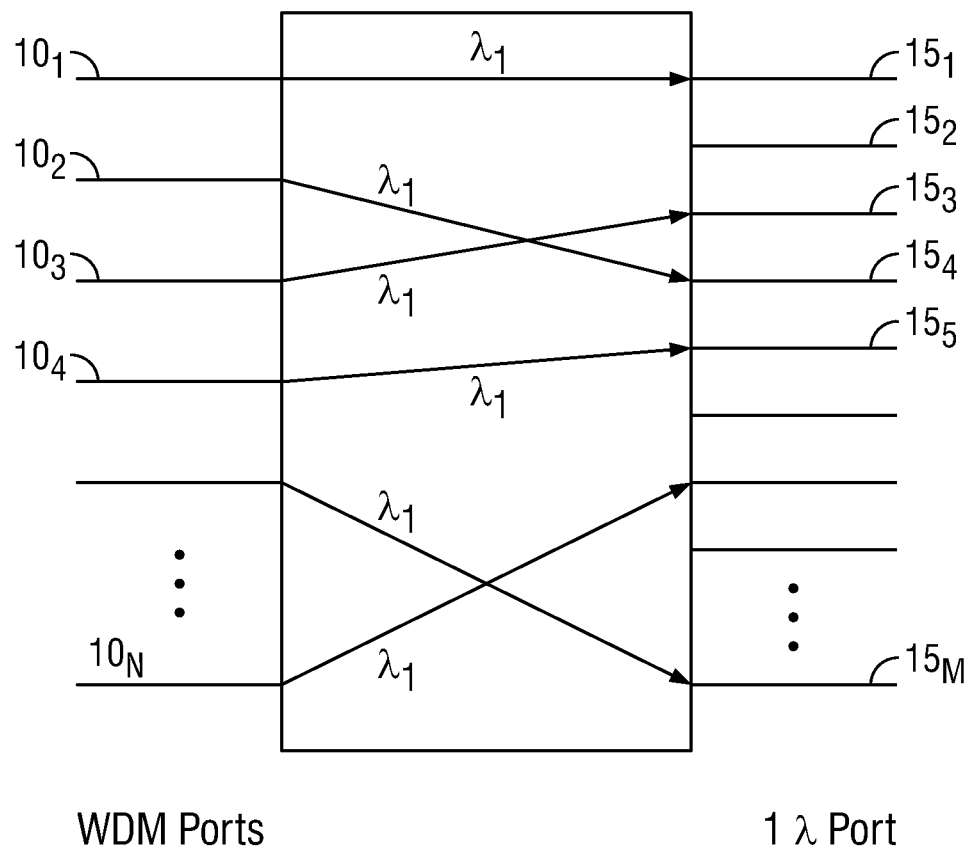
FIG. 1 shows a functional block diagram of one example of a wavelength selective switch.
Figure 2B:
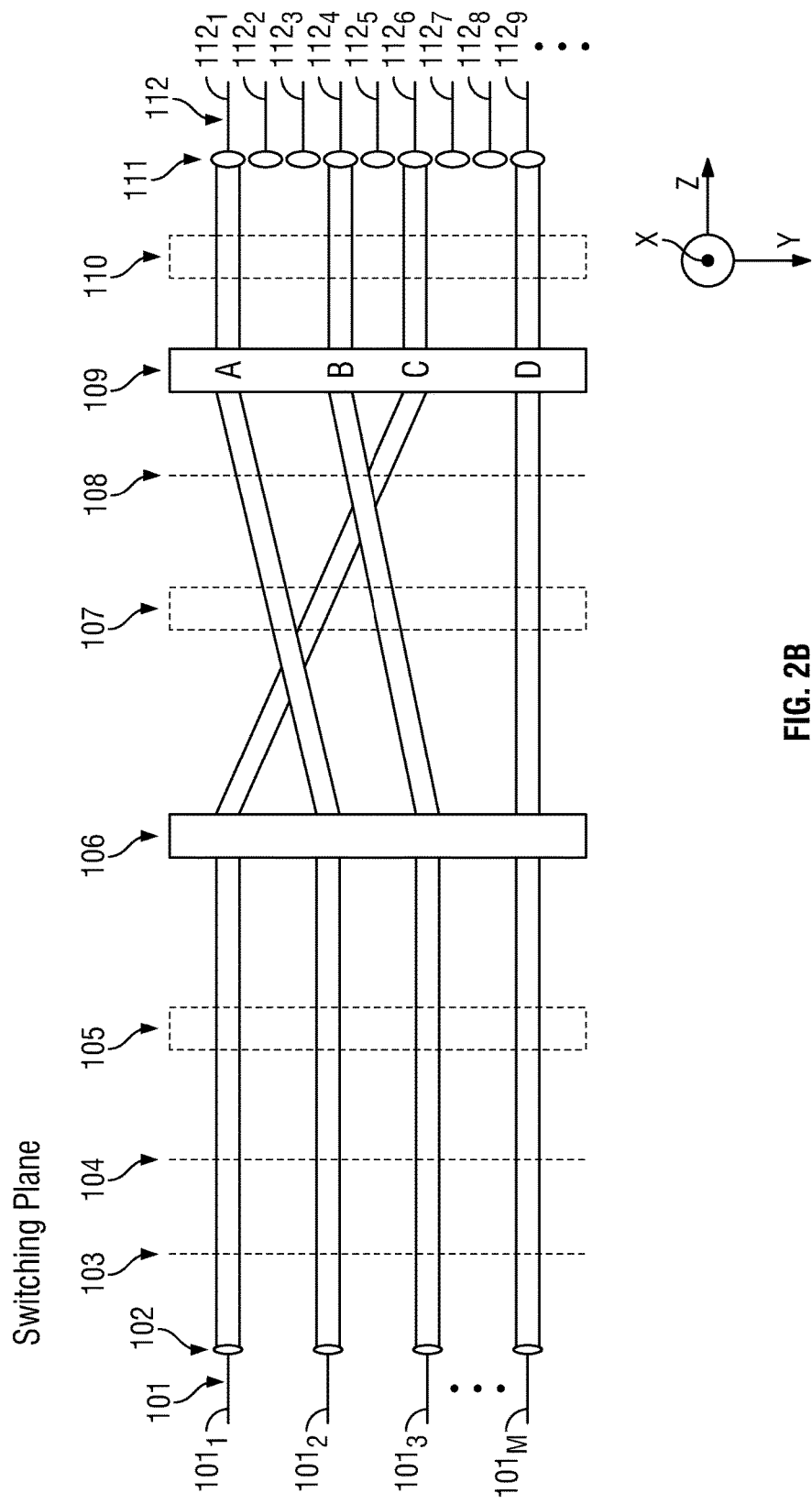

FIGS. 2A and 2B are top and side views respectively, of one example of a simplified optical device such as a multipoint contentionless wavelength selective switch (WSS) 100 that may be used in conjunction with embodiments of the present invention. The top view of FIG. 2A is also referred to herein as the dispersion plane view and the side view of FIG. 2B is also referred to herein as the switching plane view. Light is input and output to the WSS 100 through optical waveguides such as optical fibers which serve as input and output ports. As best seen in FIG. 2B, an input port array 101 may comprise a plurality of individual input fibers $101_1$, $10_2$, $101_3$ ... $101_m$ respectively coupled to collimators $102_1$, $102_2$, $102_3$ ... $102_m$. Light from one or more of the input fibers 101 is converted to a free-space beam by the collimators 102. The light exiting from input port array 101 is parallel to the z-axis. While the input port array 101 only shows four optical fiber/collimator pairs in FIG. 1B, more generally any suitable number of optical fiber/collimator pairs may be employed.

In FIGS. 2A and 2B, optical elements which affect the light in two axes are illustrated with solid lines as bi-convex optics in both views. On the other hand, optical elements which only affect the light in one axis are illustrated with solid lines in the axis that is affected. The optical elements which only affect light in one axis are also illustrated by dashed lines in the axis which they do not affect. For instance, in FIGS. 2A and 2B the optical elements 102, 106, 109 and 111 are depicted with solid lines in both figures. On the other hand, optical elements 103, 104, 105, 107 and 110 are depicted with solid lines in FIG. 1A (since they have focusing power in the dispersion plane) and with dashed lines in FIG. 1B (since they leave the beams unaffected in the switching plane). Optical element 108 is depicted with solid lines in FIG. 2B (since it affects the beams in the switching plane) and with dashed lines in FIG. 2A (since it leaves the beams unaffected in the dispersion plane).

The beams exiting the input port array 101 are directed to the collimators 102, which are cylinder lenses that collimate the beams along one axis in the switching plane and allow the beams to continue diverging in the dispersion plane. A cylinder lens 103 receives the beams from the collimators 102 and collimates the beams in the dispersion plane. The lens 103 has no significant effect on the beams in the switching plane. The beams are now collimated in both dispersion plane and the switching plane.

After being collimated in the dispersion plane by the cylinder lens 103, the beams are directed to a first wavelength dispersion element 104 (e.g., a diffraction grating or prism), which separates the free space light beams into their constituent wavelength components (or simply "wavelengths") or channels in the dispersion plane. Due to the configuration of the first wavelength dispersion element 104 (e.g., the orientation of the grating), it has no significant effect on the beams in the switching plane. The dispersed wavelengths are then directed to a cylinder lens 105, which focuses the wavelengths in the dispersion plane onto a first transmissive switching element 106. The cylinder lens 105 leaves the wavelengths largely unaffected in the switching plane.

Figure 3:
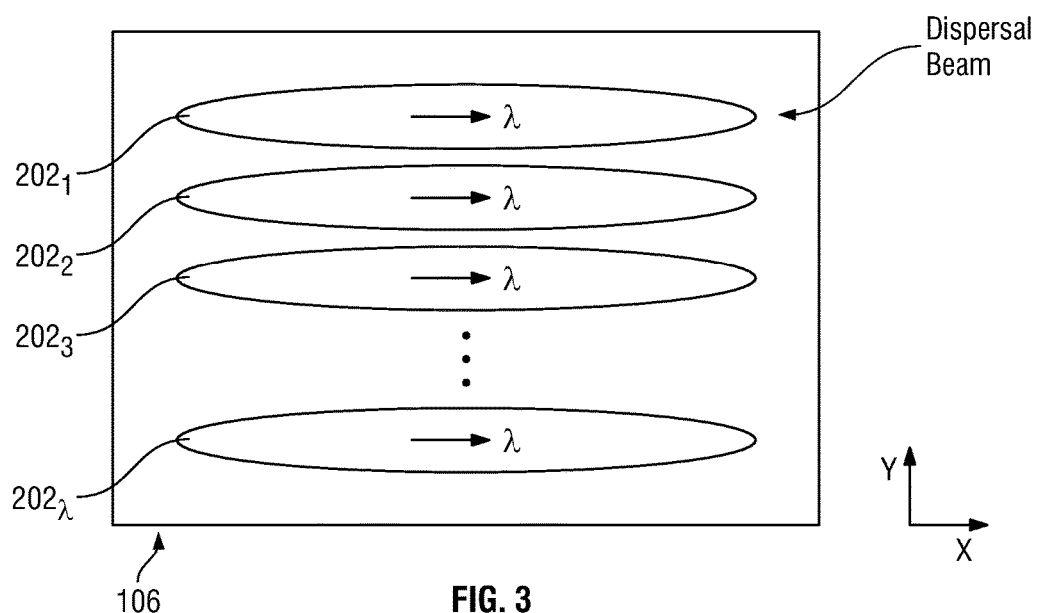
FIG. 3 is a plan view of the first switching element employed in the wavelength selective switch of FIGS. 2A and 2B onto which the input beams are imaged.

At this point, the input beams are spatially separated from one another, but each is dispersed on the switching element 106. This is illustrated in FIG. 3, which is a plan view, also known as an optical footprint view, of the first switching element 106 on which the input beams are imaged. Each one of the inputs beams $202_1$, $202_2$, $202_3$ ... $202_m$ is received from one of the fibers $101_1$, $101_2$, $101_3$ ... $101_m$ in the input array 101. As shown, any specific input beam $202_1$, $202_2$, $202_3$ ... $202_n$ is dispersed into its constituent wavelength components along the x-axis and spatially separated from the other input beams along the y-axis.

The first switching element 106 then steers the input beams in a wavelength dependent manner in the switching plane. The switching by the first switching element is performed in coordination with a second switching element 109. The manner in which this switching is performed will be explained below after specifying the remaining optical elements in the example of the optical device shown in FIGS. 2A and 2B.

After being steered by the first switching element 106, some or all of the constituent wavelengths components of each of the input beams are re-collimated in the dispersion plane by a cylinder lens 107. A second wavelength dispersion element 108 (e.g., a diffraction grating or prism), is then used to combine or un-disperse the collimated, constituent components of the beams in the dispersion plane. Cylinder lens 107 and second wavelength dispersion element 108 have no significant effect in the switching plane.

Figure 4:
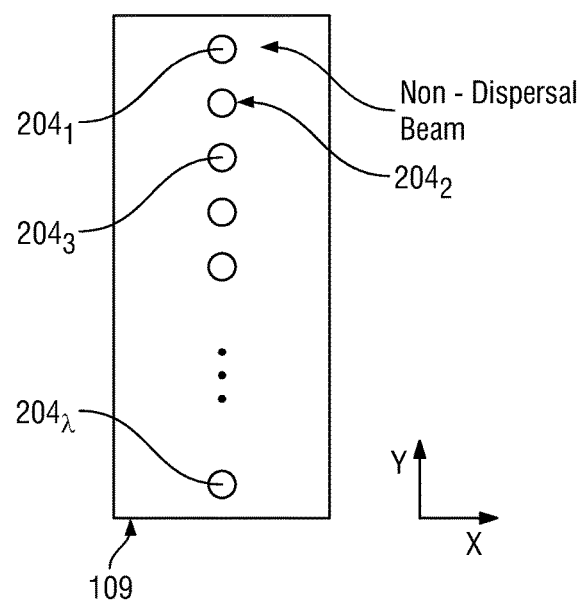
FIG. 4 is a plan view of the second switching element employed in the wavelength selective switch of FIGS. 2A and 2B onto which non-dispersed optical beams are imaged.

A second switching element 109 receives the recombined beams from the dispersion element 108. The location at which each of the beams is received on the second switching element 109 is determined by the switching performed by the first switching element 106. Specifically, the recombined beams are each selectively directed to one of the locations A, B, C, ... shown in FIG. 2B. FIG. 4 shows the beams $204_1$, $204_2$, $204_3$ ... $204_n$ arriving on the second switching element 109 at the various locations A, B, C ..., which although not dispersed, are physically separated from the other input beams $204_1$, $204_2$, $204_3$ ... $204_n$ on the second switching element 109

Cylinder lens 110, cylinder lenslet array 111 and fiber array 112 form the output optical couplings in a similar way to the input optics 101, 102 and 103. In particular, the cylinder lens 110 collimates the beams in the switching plane and directs the beams to respective ones of the cylinder lenses $111_1$, $111_2$, $111_3$, ... $111_n$ in the cylinder lenslet array 111. Each cylinder lens $111_1$, $111_2$, $111_3$, ... $111_n$ directs its respective beam to a corresponding one of the output ports $112_1$, $112_2$, $111_3$ ... $112_n$ in the output fiber port array 112.

As shown in FIG. 2B, there is a one-to-one relationship between the locations A, B, C ... on the second switching element 109 and the output ports $112_1$, $112_2$, $112_3$ ... $112_n$. That is, any subset of recombined wavelengths in each beam that is directed from any of the input ports to say, location A on the second switching element 109 will always be directed by the second switching element 109 to the same predefined one of the output ports. More generally, any subset of recombined wavelengths in each beam that is directed by any of the input ports to any particular location A, B, C ... on the second switching element 109 will always be directed by the second switching element 109 to the same predefined one of the output ports corresponding to the particular location A, B, C . . . on the second switching element 109.

In operation, first and second switching elements 106 and 109 cooperate so that any subset of wavelengths of an optical beam received by any given input port 101 may be routed to any given output port 112, provided that any given output port can only accept a subset of wavelengths from a single input port at any one time. That is, switching elements 106 and 109 are arranged so that the output ports are restricted in that they only support a connection to one input at any given time, not multiple inputs at the same time. This switching behavior will be illustrated with reference to FIGS. 5 and 6.

Figure 5:
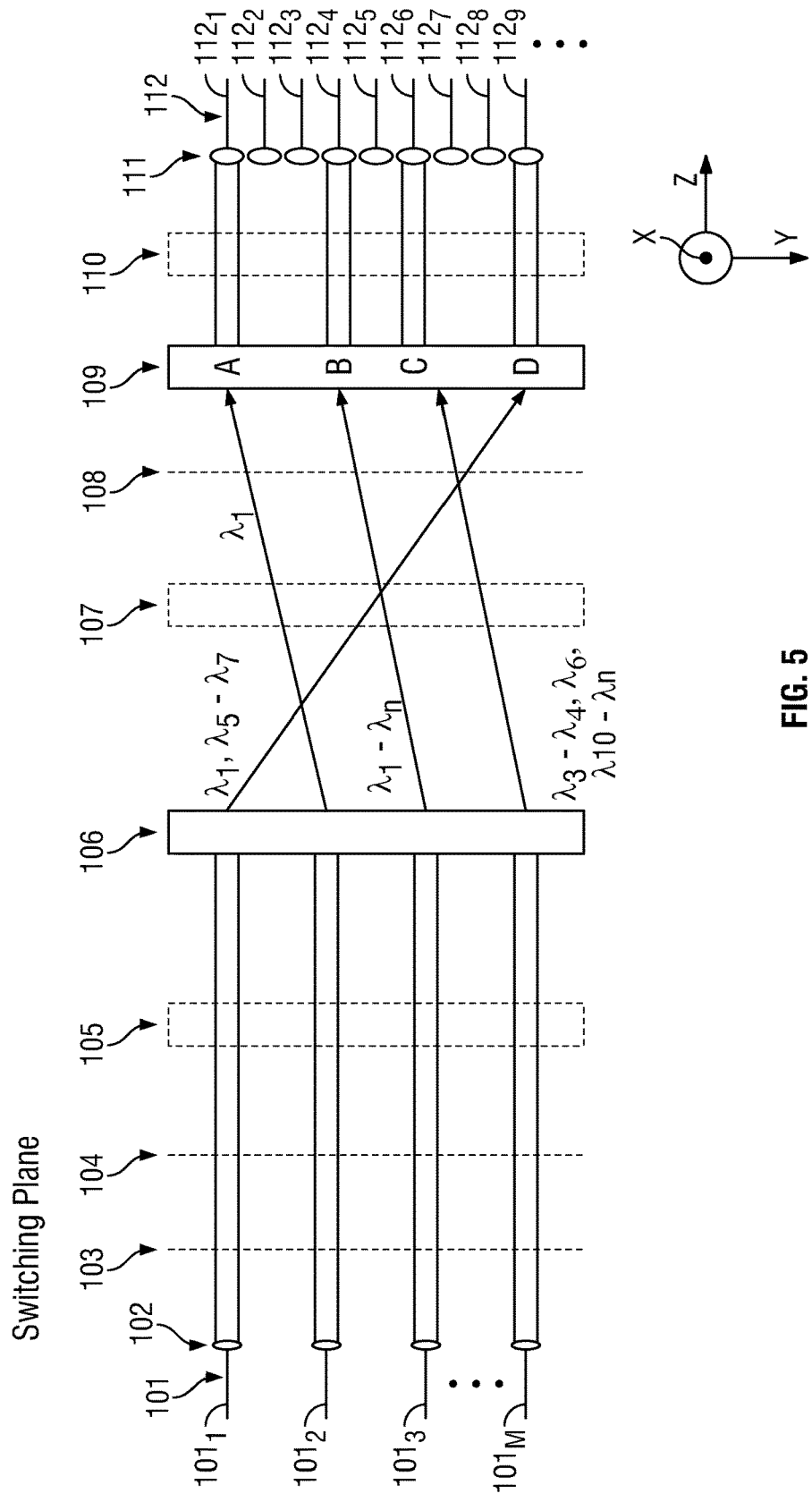
FIG. 5 is a side view of the optical device of FIGS. 2A and 2B showing various subsets of wavelengths that are received on the input ports being directed to various ones of the output ports.

FIG. 5 shows various subsets of wavelengths that are received on the input ports 101 being directed to various ones of the output ports. Each input port receives a WDM optical beam that includes wavelength components $\lambda_1$-$\lambda_n$. For example, in FIG. 5 the wavelength components $\lambda_1$ and $\lambda_5$-$\lambda_7$ of the optical beam received by input port $101_1$ are directed to output port $112_9$, the wavelength component $\lambda_1$ of the optical beam received by input port $101_2$ is directed to output port $112_1$, the wavelength components $\lambda_1$-$\lambda_n$ of the optical beam received by input port $101_3$ are directed to output port $112_5$ and the wavelength components $\lambda_3$-$\lambda_4$, $\lambda_6$ and $\lambda_{10}$-$\lambda_n$ of the optical beam received by input port $101_n$ are directed to output port $112_7$.

Figure 6:
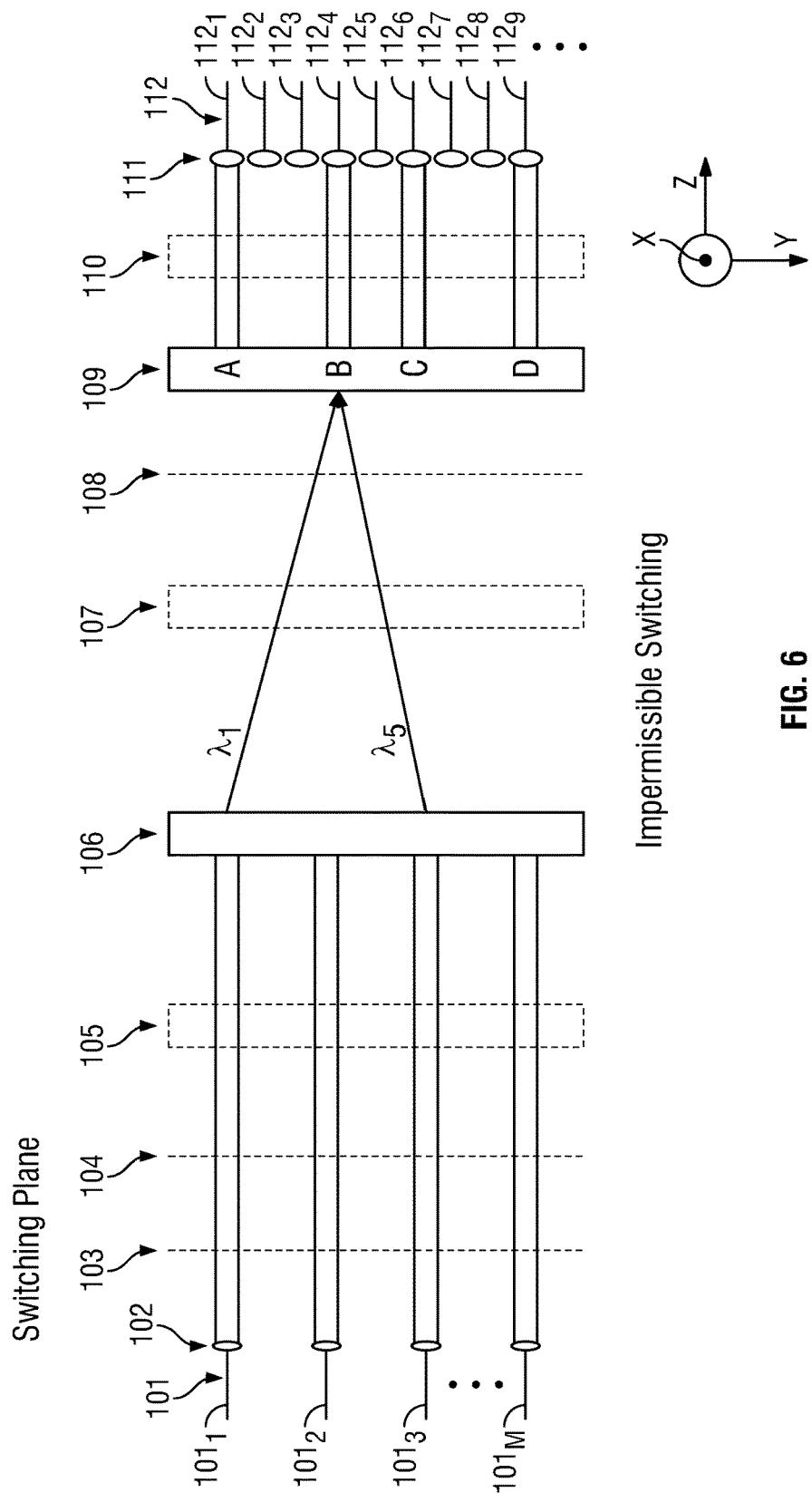
FIG. 6 is a side view of the optical device of FIGS. 2A and 2B illustrating a manner of switching two wavelengths components which the switching arrangement is incapable of performing.

In contrast to FIG. 5, FIG. 6 shows a hypothetical and impermissible situation in which wavelength components are routed from the first switching element 106 to the second switching element 109. Specifically, the switching behavior shown in FIG. 6 is impermissible because it shows location D on the second switching element 109 simultaneously receiving wavelength components from both input port $101_1$ and input port $101_3$.

The first and second switching elements 106 and 109 may be based on any of a variety of different technology platforms. For example, the first and second switching elements may be beam-steering elements such as programmable optical phase modulators or micro-electromechanical (MEMS) based devices, for instance. One example of a suitable programmable optical phase modulator is a liquid crystal on silicon (LCoS) device. One example of a MEMs-based device is a digital micromirror device (DMD). In some embodiments both the first and second switching elements 106 and 109 are based on the same technology platform or different technology platforms. For instance, in the latter case the first switching element 106 may be a programmable optical phase modulator and the second switching element 109 may be a MEMs-based device.

Figure 7:
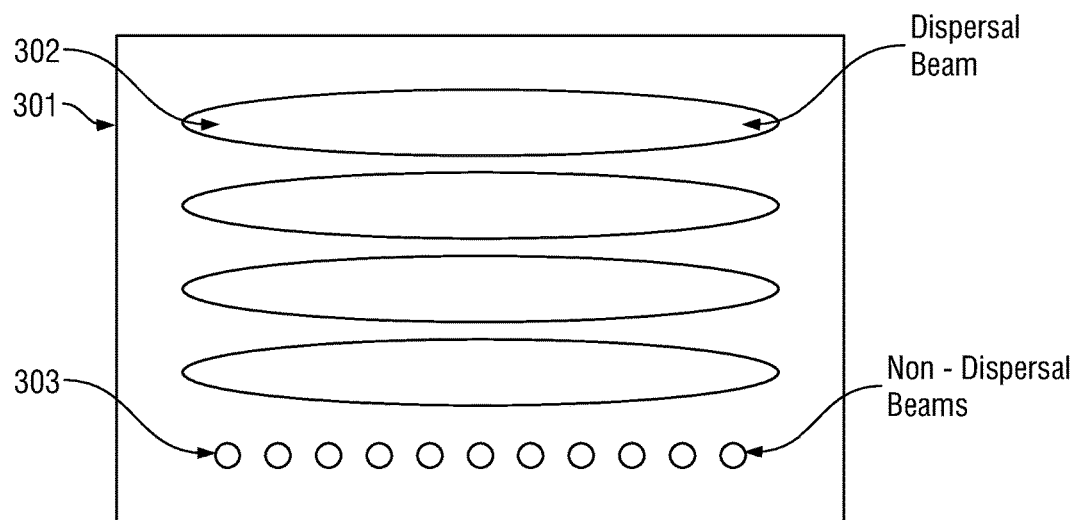
FIG. 7 is a plan view of the switching element employed in an alternative embodiment of the wavelength selective switch in which only a single switching element is employed.

In one alternative implementation, a single switching element is employed instead of the two switching elements shown in FIGS. 2-6. That is, the functions of both the first and second switching elements shown in FIGS. 2-6 are accomplished with one physical switching element. FIG. 7 shows an optical footprint view of such a combined switching element 301. The dispersed beams 302 and the non-dispersed beams 303 are physically separated and could be oriented or laid out in multiple ways. For example, although both the dispersed beams 302 and the non-dispersed beams 303 extend in the horizontal direction in FIG. 4, in other embodiments they may extend in different directions from one another (e.g., the dispersed beams 302 may extend in the horizontal direction and the non-dispersed beams 303 may extend in the vertical direction).

Figure 8:
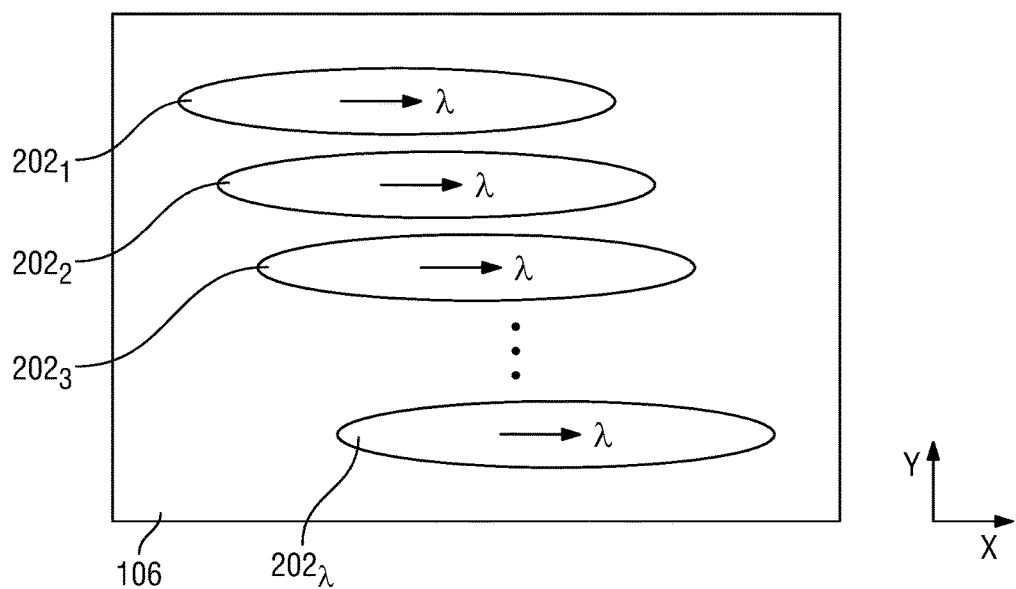
FIG. 8 is a plan view of the first switching element employed in an alternative embodiment of the wavelength selective switch of FIGS. 2A and 2B.

In another alternative implementation, crosstalk may be reduced by orienting the input ports so that that the spatially separated input beams are imaged onto the switching element 106 so that the input beams are misaligned with respect to one another. This is shown in FIG. 8, which is plan view of the switching element 106 similar to the plan view of FIG. 3. In FIG. 8, however, the input beams are staggered along the x-axis so that the same wavelengths in any two different input beams are not aligned along the y-axis.

It should be noted that the optical switch described herein may operate in a reciprocal manner such that the input ports may serve as output ports and the output ports may serve as input ports. Accordingly, the terms input and output are used interchangeably herein.

The invention claimed is:

1. An optical device, comprising:
   a plurality of optical input ports configured to receive optical beams each having a plurality of wavelength components;
   a plurality of optical output ports;
   a wavelength dispersion element for receiving the optical beams and spatially separating each of the optical beams into a plurality of wavelengths components; and
   a switching arrangement for receiving the wavelength components of the optical beams and selectively coupling any subset of the plurality of wavelength components of the optical beams to a different one of the optical output ports, provided that wavelength components of optical beams received by two of the input ports cannot be simultaneously coupled to a common one of the output ports.

2. The optical device of claim 1, wherein the subset of wavelength components of a first of the optical beams selectively coupled by the switching arrangement and the subset of wavelength components of a second of the optical beams selectively coupled by the switching arrangement include wavelength components having the same wavelength.

3. The optical device of claim 1, wherein the switching arrangement includes at least one optical beam steering arrangement having a first region onto which the spatially separated wavelength components are coupled and a second region onto which each of the selectively coupled subset of wavelength components are coupled after the wavelength components in each of the subsets are spatially recombined with one another.

4. The optical device of claim 3, wherein the at least one optical beam steering arrangement includes a single optical beam steering arrangement on which the first and second regions are located.

5. The optical device of claim 4, wherein each of the spatially separated wavelengths extend in a first direction on the first region of the single optical beam steering arrangement and the spatially recombined subsets of wavelength components extend in a row along the first direction on the second region of the single beam steering arrangement.

6. The optical device of claim 4, wherein each of the spatially separated wavelengths extend in a first direction on the first region of the single optical beam steering arrangement and the spatially recombined subsets of wavelength components extend in a row along a second direction on the second region of the single beam steering arrangement, the second direction being orthogonal to the first direction.

7. The optical device of claim 3, wherein the optical beam steering arrangement includes first and second optical beam steering arrangements, the first region being located on the first optical beam steering arrangement and the second region being located on the second optical beam steering arrangement.

8. The optical device of claim 7, wherein the first and second optical beam steering arrangements include first and second programmable optical phase modulators.

9. The optical device of claim 7, wherein the first and second optical beam steering arrangements respectively include a programmable optical phase modulator and a MEMs-based device.

10. The optical device of claim 7, wherein the first optical beam steering arrangement is a programmable optical phase modulator and the second optical beam steering arrangement is a MEMS-based device.

11. The optical device of claim 7, wherein a one-to-one relationship exists between locations on the second optical beam steering arrangement and the optical output ports such that wavelength components received at a given one of the locations is coupled to a given one of the optical output ports with which the given location has a one-to-one relationship.

12. The optical device of claim 7, wherein the first and second optical beam steering arrangements are configured to cooperate such that any given optical output port can receive wavelength components from only a single one of the optical input ports at any given time.

13. The optical device of claim 7, wherein at least one of the first and second programmable optical phase modulators includes an LCoS array.

14. The optical device of claim 7, wherein the first and second beam steering arrangements include MEMS-based devices.

15. The optical device of claim 3, wherein the wavelength dispersion element spatially separates each of the optical beams in a first plane and the switching arrangement selectively couples the spatially received subset of the plurality of wavelength components of each of the optical beams in a second plane orthogonal to the first plane.

16. The optical device of claim 3, wherein the at least one optical beam steering arrangement includes a programmable optical phase modulator.

17. The optical device of claim 16, wherein the programmable optical phase modulator includes an LCoS array.

18. The optical device of claim 3, wherein the spatially separated wavelength components are aligned on the first region of the optical beam steering arrangement.

19. The optical device of claim 3, wherein the spatially separated wavelength components are mis-aligned on the first region of the optical beam steering arrangement.

20. The optical device of claim 3, wherein the at least one beam steering arrangement includes a MEMs-based device.

21. The optical device of claim 1, wherein the switching arrangement is configured to switch selected ones of the wavelength components while they are dispersed into spatially separated wavelength component and also when they are non-dispersed.

22. The optical device of claim 1, further comprising a plurality of collimators each configured to collimate along one axis an optical beam received from one of the optical input ports.

23. The optical device of claim 1, wherein the switching arrangement switches spatially separated ones of the wavelength components and wavelength components that have been spatially recombined with one another.

24. The optical device of claim 1, wherein the subset of wavelength components selectively coupled to one of the optical output ports is a single wavelength component.

25. An optical device, comprising:
a plurality of optical input ports configured to receive optical beams each having a plurality of wavelength components;
a plurality of optical output ports;
a wavelength dispersion arrangement for receiving the optical beams and spatially separating each of the optical beams into a plurality of wavelengths components; and
at least one optical beam steering arrangement having a first region onto which the spatially separated wavelength components are coupled and a second region onto which any subset of the plurality of wavelength components of the optical beams is selectively directed after the wavelength components in each of the subsets are spatially recombined with one another, the at least one optical beam steering arrangement selectively coupling each of the subsets of the plurality of wavelength components to a different one of the optical output ports.

26. The optical device of claim 25, wherein the at least one optical beam steering arrangement includes a single optical beam steering arrangement on which the first and second regions are located.

27. The optical device of claim 26, wherein each of the spatially separated wavelengths extend in a first direction on the first region of the single optical beam steering arrangement and the spatially recombined subsets of wavelength components extend in a row along the first direction on the second region of the single beam steering arrangement.

28. The optical device of claim 26, wherein each of the spatially separated wavelengths extend in a first direction on the first region of the single optical beam steering arrangement and the spatially recombined subsets of wavelength components extend in a row along a second direction on the second region of the single beam steering arrangement, the second direction being orthogonal to the first direction.

29. The optical device of claim 25, wherein the at least one optical beam steering arrangement includes first and second optical beam steering arrangements, the first region being located on the first optical beam steering arrangement and the second region being located on the second optical beam steering arrangement.

30. The optical device of claim 29 wherein a one-to-one relationship exists between locations on the second optical beam steering arrangement and the optical output ports such that wavelength components received at a given one of the locations is coupled to a given one of the optical output ports with which the given location has a one-to-one relationship.

31. The optical device of claim 29, wherein the first and second optical beam steering arrangements are configured to cooperate such that any given optical output port can receive wavelength components from only a single one of the optical input ports at any given time.

32. The optical device of claim 29, wherein at least one of the first and second programmable optical phase modulators includes an LCoS array.

33. The optical device of claim 29, wherein the first and second beam steering arrangements include MEMS-based devices.

34. The optical device of claim 25, wherein the second region includes a plurality of locations on which the spatially recombined subsets of wavelength components are selectively couplable by the at least one optical beam steering arrangement, each of the locations being associated with a different one of the optical output ports such that any of the subsets that are coupled to a given one of the locations is received by the optical output port associated with the given location.

35. The optical device of claim 34, wherein the wavelength dispersion element spatially separates each of the optical beams in a first plane and the at least one optical beam steering arrangement selectively couples the spatially recombined subset of the plurality of wavelength components of each of the optical beams in a second plane orthogonal to the first plane.

36. The optical device of claim 25, wherein the at least optical beam steering arrangement includes a programmable optical phase modulator and a MEMs-based device, the first region being located on the programmable optical phase modulator and the second region being located on the MEMs based device.

37. The optical device of claim 25, wherein at least two of the optical beams have wavelength components located at a common wavelength.

38. The optical device of claim 25, wherein the spatially separated wavelength components are aligned on the first region of the optical beam steering arrangement.

39. The optical device of claim 38, wherein the at least one beam steering arrangement includes a MEMs-based device.

40. The optical device of claim 25, wherein the spatially separated wavelength components are mis-aligned on the first region of the optical beam steering arrangement.

41. The optical device of claim 25, wherein the at least one optical beam steering arrangement includes a programmable optical phase modulator.

42. The optical device of claim 41, wherein the programmable optical phase modulator includes an LCoS array.

43. The optical device of claim 25, wherein the at least one beam steering arrangement includes a MEMs-based device.

44. The optical device of claim 25, further comprising a plurality of collimators each configured to collimate along one axis an optical beam received from one of the optical input ports.

45. The optical device of claim 25, wherein the at least one optical beam steering arrangement switches spatially separated ones of the wavelength components and wavelength components that have been spatially recombined with one another.

46. The optical device of claim 25, wherein the subset of wavelength components selectively coupled to one of the optical output ports is a single wavelength component.

47. A method for switching wavelength components of WDM signals in a wavelength dependent manner, comprising:
receiving a plurality of optical beams each having a plurality of wavelength components;
spatially separating each of the optical beams into the plurality of wavelengths components; and
selectively coupling any subset of the plurality of wavelength components of the optical beams to a different one of a plurality of optical output ports, provided that wavelength components of optical beams received by two of the input ports cannot be simultaneously coupled to a common one of the output ports.

48. The method of claim 47, wherein the subset of wavelength components of a first of the optical beams selectively coupled by the switching arrangement and the subset of wavelength components of a second of the optical beams selectively coupled by the switching arrangement include wavelength components having the same wavelength.

49. The method of claim 47, wherein the selectively coupling comprises:

coupling the spatially separated wavelength components to a first region of at least one optical beam steering arrangement;
steering the spatially separated wavelength components in a wavelength dependent manner;
after the steering, spatially recombining the wavelength components into each of the subsets; and
coupling the subsets of spatially recombined wavelength components to a second region of the at least one optical beam steering arrangement.

50. The method of claim 49, wherein the at least one optical beam steering arrangement includes a single optical beam steering arrangement on which the first and second regions are located.

51. The method claim 49, wherein the optical beam steering arrangement includes first and second optical beam steering arrangements, the first region being located on the first optical beam steering arrangement and the second region being located on the second optical beam steering arrangement.

52. The method of claim 49, wherein the spatially separating includes spatially separating each of the optical beams in a first plane and the selectively coupling includes selectively coupling the spatially received subset of the plurality of wavelength components of each of the optical beams in a second plane orthogonal to the first plane.

53. The method of claim 49, wherein at least one of the subsets of the spatially separated wavelength components includes only a single wavelength component.

54. A method for switching wavelength components of one or more WDM signals in a wavelength dependent manner, comprising:
receiving a plurality of optical beams each having a plurality of wavelength components;
spatially separating each of the optical beams into the plurality of wavelengths components; and
steering the spatially separated wavelength components in a wavelength dependent manner;
after the steering, spatially recombining the wavelength components into one or more subsets; and
steering the one or more subsets of spatially recombined wavelength components to one or more optical output ports, respectively.

55. The method of claim 54, wherein steering the spatially separated wavelength components and steering the one or more subsets includes steering the spatially separated wavelength components and steering the one or more subsets with at least one optical beam steering arrangement.

56. The method of claim 55, further comprising coupling the spatially separated wavelength components to a first region of the at least one optical beam steering arrangement, wherein coupling the one or more subsets to one or more optical output ports includes directin the one or more subsets to a second region of the optical beam steering arrangement.

57. The method of claim 56, wherein the at least one optical beam steering arrangement includes first and second optical beam steering arrangements, the first region being located on the first optical beam steering arrangement and the second region being located on the second optical beam steering arrangement.

58. The method of claim 57, wherein the second region includes a plurality of locations on which the spatially recombined subsets of wavelength components are selectively couplable by the at least one optical beam steering arrangement, each of the locations being associated with a different one of the optical output ports such that any of the subsets that are coupled to a given one of the locations is received by the optical output port associated with the given location.

59. The method of claim 57, wherein the spatially separating includes spatially separating each of the optical beams in a first plane and the steering includes steering the one or more subsets in a second plane orthogonal to the first plane.

60. The method of claim 54, wherein at least two of the optical beams have wavelength components located at a common wavelength.

61. The method of claim 54, wherein at least one of the subsets of the spatially separated wavelength components includes only a single wavelength component.

62. An optical device, comprising:
a plurality of optical input ports configured to receive optical beams each having a plurality of wavelength components;
a plurality of optical output ports;
a wavelength dispersion element for receiving the optical beams and spatially separating each of the optical beams into a plurality of wavelengths components; and
a switching arrangement for receiving the optical beams and selectively coupling any subset of the plurality of wavelength components of the optical beams to a different one of the optical output ports, provided that wavelength components of optical beams received by one of the input ports cannot be simultaneously coupled to more than one of the output ports.

63. The optical device of claim 62, wherein the subset of wavelength components of a first of the optical beams selectively coupled by the switching arrangement and the subset of wavelength components of a second of the optical beams selectively coupled by the switching arrangement include wavelength components having the same wavelength.

64. The optical device of claim 62, wherein the switching arrangement includes at least one optical beam steering arrangement having a first region onto which the spatially separated wavelength components are coupled and a second region onto which each of the selectively coupled subset of wavelength components are coupled after the wavelength components in each of the subsets are spatially recombined with one another.

65. The optical device of claim 64, wherein the at least one optical beam steering arrangement includes a single optical beam steering arrangement on which the first and second regions are located.

66. The optical device of claim 65, wherein each of the spatially separated wavelengths extend in a first direction on the first region of the single optical beam steering arrangement and the spatially recombined subsets of wavelength components extend in a row along the first direction on the second region of the single beam steering arrangement.

67. The optical device of claim 65, wherein each of the spatially separated wavelengths extend in a first direction on the first region of the single optical beam steering arrangement and the spatially recombined subsets of wavelength components extend in a row along a second direction on the second region of the single beam steering arrangement, the second direction being orthogonal to the first direction.

68. The optical device of claim 64, wherein the optical beam steering arrangement includes first and second optical beam steering arrangements, the first region being located on the first optical beam steering arrangement and the second region being located on the second optical beam steering arrangement.

69. The optical device of claim 68, wherein the first and second optical beam steering arrangements include first and second programmable optical phase modulators.

70. The optical device of claim 68, wherein the first and second optical beam steering arrangements respectively include a programmable optical phase modulator and a MEMs-based device.

71. The optical device of claim 68, wherein the first optical beam steering arrangement is a programmable optical phase modulator and the second optical beam steering arrangement is a MEMs-based device.

72. The optical device of claim 68, wherein a one-to-one relationship exists between locations on the second optical beam steering arrangement and the optical output ports such that wavelength components received at a given one of the locations is coupled to a given one of the optical output ports with which the given location has a one-to-one relationship.

73. The optical device of claim 68, wherein the first and second optical beam steering arrangements are configured to cooperate such that any given optical output port can receive wavelength components from only a single one of the optical input ports at any given time.

74. The optical device of claim 68, wherein at least one of the first and second programmable optical phase modulators includes an LCoS array.

75. The optical device of claim 68, wherein the first and second beam steering arrangements include MEMS-based devices.

76. The optical device of claim 64, wherein the wavelength dispersion element spatially separates each of the optical beams in a first plane and the switching arrangement selectively couples the spatially received subset of the plurality of wavelength components of each of the optical beams in a second plane orthogonal to the first plane.

77. The optical device of claim 64, wherein the at least one optical beam steering arrangement includes a programmable optical phase modulator.

78. The optical device of claim 77, wherein the programmable optical phase modulator includes an LCoS array.

79. The optical device of claim 64, wherein the spatially separated wavelength components are aligned on the first region of the optical beam steering arrangement.

80. The optical device of claim 64, wherein the spatially separated wavelength components are mis-aligned on the first region of the optical beam steering arrangement.

81. The optical device of claim 62, wherein the switching arrangement is configured to switch selected ones of the wavelength components while they are dispersed into spatially separated wavelength component and also when they are non-dispersed.

82. The optical device of claim 62, further comprising a plurality of collimators each configured to collimate along one axis an optical beam received from one of the optical input ports.

83. The optical device of claim 62, wherein the switching arrangement switches spatially separated ones of the wavelength components and wavelength components that have been spatially recombined with one another.

84. The optical device of claim 62, wherein the subset of wavelength components selectively coupled to one of the optical output ports is a single wavelength component.

85. A method for switching wavelength components of WDM signals in a wavelength dependent manner, comprising:
receiving a plurality of optical beams each having a plurality of wavelength components;

spatially separating each of the optical beams into the plurality of wavelengths components; and selectively coupling any subset of the plurality of wavelength components of the optical beams to a different one of a plurality of optical output ports, provided that wavelength components of optical beams received by one of the input ports cannot be simultaneously coupled to more than one of the output ports.

86. The method of claim 85, wherein the subset of wavelength components of a first of the optical beams selectively coupled by the switching arrangement and the subset of wavelength components of a second of the optical beams selectively coupled by the switching arrangement include wavelength components having the same wavelength.

87. The method of claim 85, wherein the selectively coupling comprises:

coupling the spatially separated wavelength components to a first region of at least one optical beam steering arrangement;

steering the spatially separated wavelength components in a wavelength dependent manner;

after the steering, spatially recombining the wavelength components into each of the subsets; and coupling the subsets of spatially recombined wavelength components to a second region of the at least one optical beam steering arrangement.

88. The method of claim 87, wherein the at least one optical beam steering arrangement includes a single optical beam steering arrangement on which the first and second regions are located.

89. The method claim 87, wherein the optical beam steering arrangement includes first and second optical beam steering arrangements, the first region being located on the first optical beam steering arrangement and the second region being located on the second optical beam steering arrangement.

90. The method of claim 87, wherein the spatially separating includes spatially separating each of the optical beams in a first plane and the selectively coupling includes selectively coupling the spatially received subset of the plurality of wavelength components of each of the optical beams in a second plane orthogonal to the first plane.

91. The method of claim 87, wherein at least one of the subsets of the spatially separated wavelength components includes only a single wavelength component.

* * * * *